United States Patent
Yoon (10) Patent No.: US 12,079,492 B2
(45) Date of Patent: Sep. 3, 2024

(54) MEMORY DEVICE WITH FLEXIBLE DATA PIN CONFIGURATION AND METHOD THEREOF

(71) Applicant: Winbond Electronics Corp., Taichung (TW)

(72) Inventor: Minho Yoon, Taichung (TW)

(73) Assignee: Winbond Electronics Corp., Taichung (TW)

( * ) Notice: Subject to any disclaimer, the term of this patent is extended or adjusted under 35 U.S.C. 154(b) by 0 days.

(21) Appl. No.: 18/154,850

(22) Filed: Jan. 16, 2023

(65) Prior Publication Data
US 2024/0241652 A1    Jul. 18, 2024

(51) Int. Cl.
*G06F 3/06* (2006.01)

(52) U.S. Cl.
CPC .......... *G06F 3/0625* (2013.01); *G06F 3/0659* (2013.01); *G06F 3/0673* (2013.01)

(58) Field of Classification Search
CPC .... G06F 3/0625; G06F 3/0659; G06F 3/0673; G06F 3/0679; G06F 13/1668; G06F 3/065; G06F 3/0619; G11C 7/1087; G11C 7/1084; G11C 7/106; G11C 7/1057
See application file for complete search history.

(56) References Cited

U.S. PATENT DOCUMENTS

| | | | |
|---|---|---|---|
| 8,305,819 B2 | 11/2012 | Kim et al. | |
| 8,331,161 B2 * | 12/2012 | Noh | G11C 7/1051 365/189.05 |
| 8,811,055 B2 | 8/2014 | Yoon | |
| 11,783,874 B2 * | 10/2023 | Park | G11C 7/1012 365/189.02 |
| 2013/0103991 A1 * | 4/2013 | Evain | G11C 29/846 714/701 |
| 2013/0166836 A1 | 6/2013 | Berke | |
| 2018/0300266 A1 * | 10/2018 | Lucky | G06F 13/4063 |

FOREIGN PATENT DOCUMENTS

TW    200849248    12/2008

OTHER PUBLICATIONS

"Office Action of Taiwan Counterpart Application", issued on May 16, 2024, p. 1-p. 8.

* cited by examiner

*Primary Examiner* — Khoa D Doan
(74) *Attorney, Agent, or Firm* — JCIPRNET (57) ABSTRACT

A memory device includes at least one memory bank, a plurality of data pins coupled to a plurality of package pins, a data input/output (IO) circuit, at least one bank IO circuit and a plurality of switches. The package pins correspond to a first bit order, and the data pins correspond to a second bit order. The data IO circuit is configured to communicate a first data with the data pins, wherein the first data is arranged in the first bit order. The bank IO circuit is configured to communicate a second data with the memory bank, wherein the second data is arranged in the second bit order. The plurality of switches perform at least one swapping operation on the first data to generate the second data or to perform the at least one swapping operation on the second data to generate the first data.

16 Claims, 6 Drawing Sheets

MEMORY DEVICE WITH FLEXIBLE DATA PIN CONFIGURATION AND METHOD THEREOF

BACKGROUND

Technical Field

The disclosure relates to a memory device, and more particularly relates to a reading method and a writing method thereof that can be flexibly assigning configuration for data pins of the memory device.

Description of Related Art

A memory device such as a dynamic random-access memory (DRAM) chip is widely used in many electronic devices for storing information. During a packaging process of a DRAM device, data pins are physically connected to corresponding package pins to form a DRAM package. When a configuration of data pins of the DRAM chip is different from a configuration of the corresponding package pins, an additional redistribution layer (RDL) is required to connect the data pins of the DRAM chip to the corresponding package pins of the DRAM package. However, the additional redistribution layer increases manufacturing cost, power consumption and an occupied space of the package.

SUMMARY

In some embodiments of the disclosure, the memory device includes at least one memory bank, a plurality of data pins, a data input/output (IO) circuit, at least one bank IO circuit and a plurality of switches. The at least one memory bank includes a plurality of memory cells. The plurality of data pins are coupled to a plurality of package pins, wherein the plurality of package pins correspond to a first bit order, and the plurality of data pins correspond to a second bit order. The data IO circuit is configured to communicate a first data with the plurality of data pins, wherein the first data is arranged in the first bit order. The at least one bank IO circuit is configured to communicate a second data with the at least one memory bank, wherein the second data is arranged in the second bit order. The plurality of switches are configured to perform at least one swapping operation on the first data to generate the second data or to perform the at least one swapping operation on the second data to generate the first data.

In some embodiments of the disclosure, a writing method of a memory device is introduced, in which the memory device includes a plurality of data pins being coupled to a plurality of package pins, the plurality of package pins correspond to a first bit order, and the plurality of data pins correspond to a second bit order. The writing method includes steps of receiving, by a data IO circuit of the memory device, a first writing data from the plurality of package pins via the plurality of data pins, wherein the first writing data is arranged in the first bit order; performing, by a plurality of switches of the memory device, at least one swapping operation on the first writing data to generate a second writing data, wherein the second writing data is arranged in the second bit order; and writing, by at least one bank IO circuit of the memory device, the second writing data to at least one memory bank of the memory device.

In some embodiments of the disclosure, a reading method of a memory device is introduced, in which the memory device includes a plurality of data pins being coupled to a plurality of package pins, the plurality of package pins correspond to a first bit order, and the plurality of data pins correspond to a second bit order. The reading method includes steps of reading, by a bank IO circuit of the memory device, a first reading data from at least one memory bank of the memory device, wherein the first data is arranged in the second bit order; performing, by a plurality of switches of the memory device, at least one swapping operation on the first reading data to generate a second reading data, wherein the second reading data is arranged in the first bit order; and outputting, by a data IO circuit of the memory device, the second reading data to the plurality of package pins via the plurality of data pins.

In the embodiments of the disclosure, a plurality of switches of the memory device are configured to perform at least one swapping operation to flexibility assign the configuration (i.e., bit order) of the data pins, such that the data pins are compatible with various configurations of package pins. In this way, no redistribution layer is required between the data pins and the package pins, resulting in a memory device package with a small occupied space, low power consumption. The memory device in the disclosure is applicable for a wide range of applications.

To make the above features and advantages provided in one or more of the embodiments of the disclosure more comprehensible, several embodiments accompanied with drawings are described in detail as follows.

DESCRIPTION OF THE EMBODIMENTS

References are made in detail to the present preferred embodiments of the invention, examples of which are illustrated in the accompanying drawings. Wherever possible, the same reference numbers are used in the drawings and the description to refer to the same or like parts.

Figure 1:
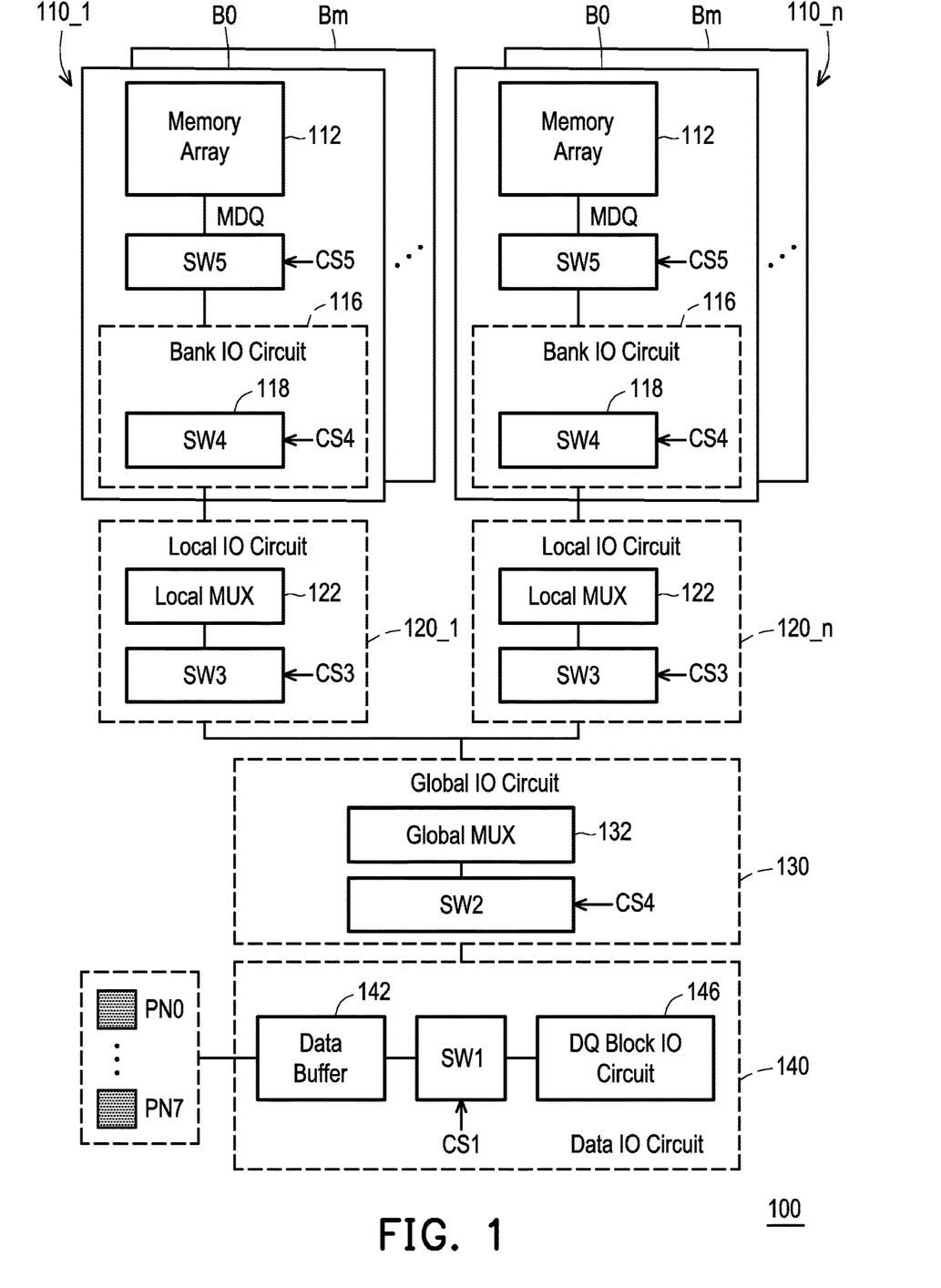
FIG. 1 is a schematic diagram of a memory device in accordance with some embodiments.

Referring to FIG. 1, a memory device 100 may include a plurality of memory bank groups 101_1 through 101_n, a plurality of local input/output (IO) circuit 120_1 through 120_n, a global IO circuit 130, a data IO circuit 140 and a plurality of data pins PN0 through PN7, in which n is a positive integer. In some embodiments, each of the memory groups 101_1 through 101_n includes a plurality of memory banks B0 through Bm, where m is a positive integer. Each of the memory banks B0 through Bm may include a memory array 112, a switch SW5 (also referred to as a fifth switch) and a bank IO circuit 116, in which the memory array 112 may include a plurality of memory cells (not shown) arranged in rows and columns. The memory cells may be accessed through a plurality of bit lines (not shown), a plurality of word lines (not shown) and a plurally of source lines (not shown) being coupled to the memory cells. In some embodiments, the memory array 112 is a dynamic random-access memory (DRAM) memory array, but the disclosure does not intend to limit the memory array 112 to any specific memory array type.

In some embodiments, the switch SW5 is coupled between the memory array 112 and the bank IO circuit 116, and is controlled by a control signal CS5 (also referred to as a fifth control signal). In a read operation, the switch SW5 may receive reading data from memory array 112, perform a swapping operation on the reading data according to the control signal CS5 to generate a swapped reading data, and provide the swapped reading data to the bank IO circuit 116. Alternatively, the switch SW5 may simply forward the reading data from memory array 112 to the bank IO circuit 116 without performing the swapping operation. For example, when the configuration of the data pins PN0 through PN7 is compatible with the configuration of package pins (not shown), the switch SW5 does not perform the swapping operation. In a write operation, the switch SW5 may receive writing data from the bank IO circuit 116, perform a swapping operation on the writing data according to the control signal CS5 to generate a swapped writing data, and providing the swapped writing data to the memory array 112. Alternatively, the switch SW5 may simply forward the writing data to the memory array 112 without performing the swapping operation (i.e., when the configuration of the data pins PN0 through PN7 is compatible with the configuration of package pins).

The bank IO circuit 116 may be coupled to the memory array 112 via the switch SW5, and configured to perform an accessing operation (i.e., read operation, write operation) to memory cells of the memory array 112. For example, the bank IO circuit 116 may include a sense amplifier (not shown) that is configured to sense data stored in the memory cells of the memory array 112 in the read operation. The bank IO circuit 116 may further include a writing circuit (not shown) that is configured to write data to the memory cells of the memory array 112 in the write operation. In some embodiments, the bank IO circuit 116 further includes a switch SW4 (also referred to as a fourth switch or switch 118 in FIG. 1) which is controlled by a control signal CS4. The switch SW4 may receive an input data at input terminals of the switch SW4, perform a swapping operation on the received input data to generate a swapped data, and provide the swapped data to output terminals of the switch SW4. For example, in the read operation, the switch SW4 may receive reading data from memory array 112 via the switch SW5, perform a swapping operation on the reading data according to the control signal CS4 to generate a swapped reading data, and provide the swapped reading data to one of the local IO circuits 120_1 through 120_n. Alternatively, the switch SW4 may simply forward the reading data from the switch SW5 to one of the local IO circuits 120_1 through 120_n without performing the swapping operation (i.e., when the configuration of the data pins PN0 through PN7 is compatible with the configuration of package pins). In the write operation, the switch SW4 may receive writing data from one of the local IO circuits 120_1 through 120_n, perform a swapping operation on the writing data according to the control signal CS4 to generate a swapped writing data, and providing the swapped writing data to the switch SW5. Alternatively, the switch SW4 may simply forward the writing data from one of the local IO circuits 120_1 through 120_n to the switch SW5 without performing the swapping operation (i.e., when the configuration of the data pins PN0 through PN7 is compatible with the configuration of package pins). In some embodiments, the bank IO circuit 116 may transfer data with the memory array 112 through main data lines (MDQ) and the switch SW5. It is appreciated that the bank IO circuit 116 may include peripheral circuits that have various functions for proper operations of the memory arrays 112. For example, the bank IO circuit 116 may further include a row decoder, a column decoder, at least one multiplexer for decoding and selecting at least one memory cells of the memory array 112 for the read and write operations.

In some embodiments, the local IO circuits 120_1 through 120_n is coupled to corresponding memory bank groups 110_1 through 110_n, respectively. Each of the local IO circuits 120_1 through 120_n may include a local multiplexer and a switch. For example, the local IO circuit 120_1 includes a local multiplexer 122 and a switch SW3 (also referred to as a third switch). The local multiplexer 122 may select the bank IO circuit 116 of a memory bank among the memory banks B0 through Bm of the corresponding memory bank group 101_1 for transferring the reading data and the writing data between the selected bank IO circuit 116 and the global IO circuit 130. For example, in the read operation, the local IO circuit 120_1 is configured to transfer reading data from the selected bank IO circuit 116 to the global IO circuit 130; and in the write operation, the local IO circuit 120_1 is configured to transfer writing data from the global IO circuit 130 to the selected bank IO circuit 116.

In some embodiments, the switch SW3 is coupled to the local multiplexer 122, and is controlled by a control signal CS3. In the read operation, the switch SW3 may receive reading data from the selected bank IO circuit 116, perform a swapping operation on the reading data according to the control signal CS3 to generate a swapped reading data, and provide the swapped reading data to the global IO circuit 130. Alternatively, the switch SW3 may simply forward the reading data from the selected bank IO circuit to the global IO circuit without performing the swapping operation (i.e., when the configuration of the data pins PN0 through PN7 is compatible with the configuration of package pins). In the write operation, the switch SW3 may receive writing data from the global IO circuit 130, perform a swapping operation on the writing data according to the control signal CS3 to generate a swapped writing data, and provide the swapped writing data to the selected bank IO circuit 116. Alternatively, the switch SW3 may simply forward the writing data from the global IO circuit 130 to the selected bank IO circuit 116 without performing the swapping operation (i.e., when the configuration of the data pins PN0 through PN7 is compatible with the configuration of package pins).

In some embodiments, the global IO circuit 130 is coupled between the local IO circuits 120_1 through 120_n and the data IO circuit 140, and is configured to transfer data between the local IO circuits 120_1 through 120_n and the data IO circuit 140. The global IO circuit 130 may include a global multiplexer 132 and a switch SW2 (also referred to as a second switch). The global multiplexer 132 is configured to select a local IO circuit among the local IO circuits 120_1 through 120_n, and transfer the reading data and the writing data between the selected local IO circuit and the data IO circuit 140. In the read operation, the global IO circuit 130 is configured to transfer reading data from the selected local IO circuit to data IO circuit 140; and in the write operation, the global IO circuit 130 is configured to transfer writing data from the data IO circuit 140 to the selected local IO circuit.

In some embodiments, the switch SW2 is coupled to the global multiplexer 132 and is controlled by a control signal CS2 (also referred to as second control signal). In the read operation, the switch SW3 may receive reading data from the selected local IO circuit among the local IO circuits 120_1 through 120_n, perform a swapping operation on the reading data according to the control signal CS2 to generate a swapped reading data, and provide the swapped reading data to the data IO circuit 140. Alternatively, the switch SW2 may simply forward the reading data from the selected local IO circuit to the data IO circuit 140 without performing the swapping operation (i.e., when the configuration of the data pins PN0 through PN7 is compatible with the configuration of package pins). In the write operation, the switch SW2 may receive writing data from the data IO circuit 140, perform a swapping operation on the writing data according to the control signal CS2 to generate a swapped writing data, and provide the swapped writing data to the selected local IO circuit. Alternatively, the switch SW2 may simply forward the writing data from the data IO circuit 140 to the selected local IO circuit without performing the swapping operation (i.e., when the configuration of the data pins PN0 through PN7 is compatible with the configuration of package pins).

In some embodiments, the data IO circuit 140 is coupled between the global IO circuit 130 and the data pins PN0 through PN7, and is configured to transfer data between the global IO circuit 130 and the data pins PN0 through PN7. The data IO circuit 140 may include a data buffer 142, a switch SW1 (also referred to as a first switch) and a data output (DQ) block IO circuit 146. The data buffer 142 and the DQ block IO circuit 146 are configured to transfer data between the data pins PN0 through PN7 and the switch 142.

In the read operation, the data IO circuit 140 is configured to transfer reading data from the global IO circuit 130 to the data pins PN0 through PN7. The DQ block IO circuit 146 may receive the reading data from the global IO circuit 130, and provide the reading data to the switch SW1. The switch SW1 may perform a swapping operation on the reading data provided by the DQ block IO circuit 146 according to the control signal CS1 to generate a swapped reading data, and provide the swapped reading data to the data buffer 142. Alternatively, the switch SW1 may simply forward the reading data from the DQ block IO circuit 146 to the data buffer 142 without performing the swapping operation. The data buffer 142 may receive the reading data or the swapped reading data from the switch SW1, and output the reading data or the swapped reading data to the data pins PN0 through PN7.

In the write operation, the data IO circuit 140 is configured to transfer writing data from data pins PN0 through PN7 to the global IO circuit 130. The data buffer 142 may receive the writing data from the data pins PN0 through PN7 and provide the writing data to the switch SW1. The switch SW1 may perform a swapping operation on the writing data provided by the data buffer 142 according to the control signal CS1 to generate a swapped writing data. Alternatively, the switch SW1 may simply forward the writing data provided by the data buffer 142 to the DQ block IO circuit 146 without performing the swapping operation. The data buffer 142 may receive the writing data or the swapped writing data from the switch SW1, and output the writing data or the swapped writing data to the global IO circuit 130.

In some embodiments, the control signals CS1 through CS5 are asserted from an external device, such as a memory controller (not shown). The control signals CS1 through CS5 are configured to control operations of the switches SW1 through SW5 respectively to perform at least one swapping operation on reading data or writing data. In some embodiments, the control signals CS1 through CS5 are determined according to configuration of the data pins PN0 through PN7 and the configuration of the package pins (i.e., package pins PK0 through PK7 in FIG. 3). For example, the control signals CS1 through CS5 are determined according to a difference between a bit order corresponding to the data pins PN0 through PN7 and a bit order corresponding to the package pins. When the bit order corresponding to the data pins PN0 through PN7 is the same as the bit order corresponding to the package pins (or when the configuration of the data pins PN0 through PN7 is compatible with the configuration of the package pins), the control signals CS1 through CS5 control the switches SW1 through SW5 to not performing the swapping operations. When the bit order corresponding to the data pins PN0 through PN7 is different from the bit order corresponding to the package pins, the control signals CS1 through CS5 control the switches SW1 through SW5 to perform at least one swapping operation to flexibly assign the bit order for the data pins PN0 through PN7. The bit order corresponding to the data pins may refer to bit arrangement of data asserted to the data pins; and the bit order corresponding to the package pins may refer to a bit arrangement of data asserted to the package pins. For example, the bit order corresponding to the data pins may be [D<7>, D<1>, D<2>, D<3>, D<4>, D<5>, D<6>, D<0>], and the bit order corresponding to the package pins may be [D<0>, D<1>, D<2>, D<3>, D<4>, D<5>, D<6>, D<7>].

Figure 2:
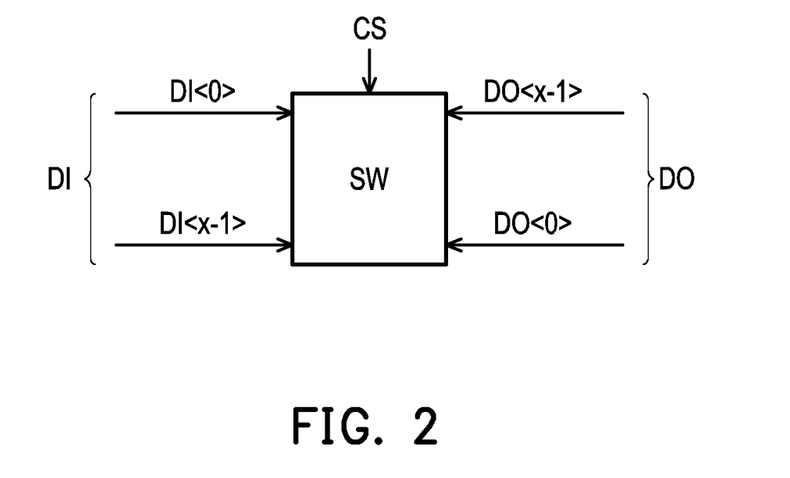
FIG. 2 is a schematic diagram of a switch of a memory device in accordance with some embodiments.

FIG. 2 illustrates a schematic diagram of a switch SW in accordance with some embodiments, in which switch SW may be any one of the switches SW1 through SW5 in FIG. 1. The switch SW may have a plurality of input terminals, a plurality of output terminals and a control terminal that receives a control signal CS, in which x is a positive integer. The input terminals of the switch SW may receive input data DI that include bit values DI(0) through DI(x−1); and the output terminals of the switch SW outputs output data DO that include bit values DO(0) through DO(x−1). The bit order of the input data DI may be the same as or different from the bit order of the output data DO. For example, when the configuration of the data pins is the same as the configuration of the package pins, the switch SW may forward the input data DI from the input terminals of the switch SW to the output terminals of the switch SW without performing the swapping operation, resulting in the same as bit order of the input data DI and the output data DO. When the configuration of the data pins in different from the configuration of the package pins, the switch SW may perform the swapping operation on the input data DI, resulting in different bit orders of the input data DI and the output data DO. The disclosure does not intend to limit the structure of the switch SW, and any circuitry that is capable of swapping data fall within the scope of the disclosure.

Figure 3:
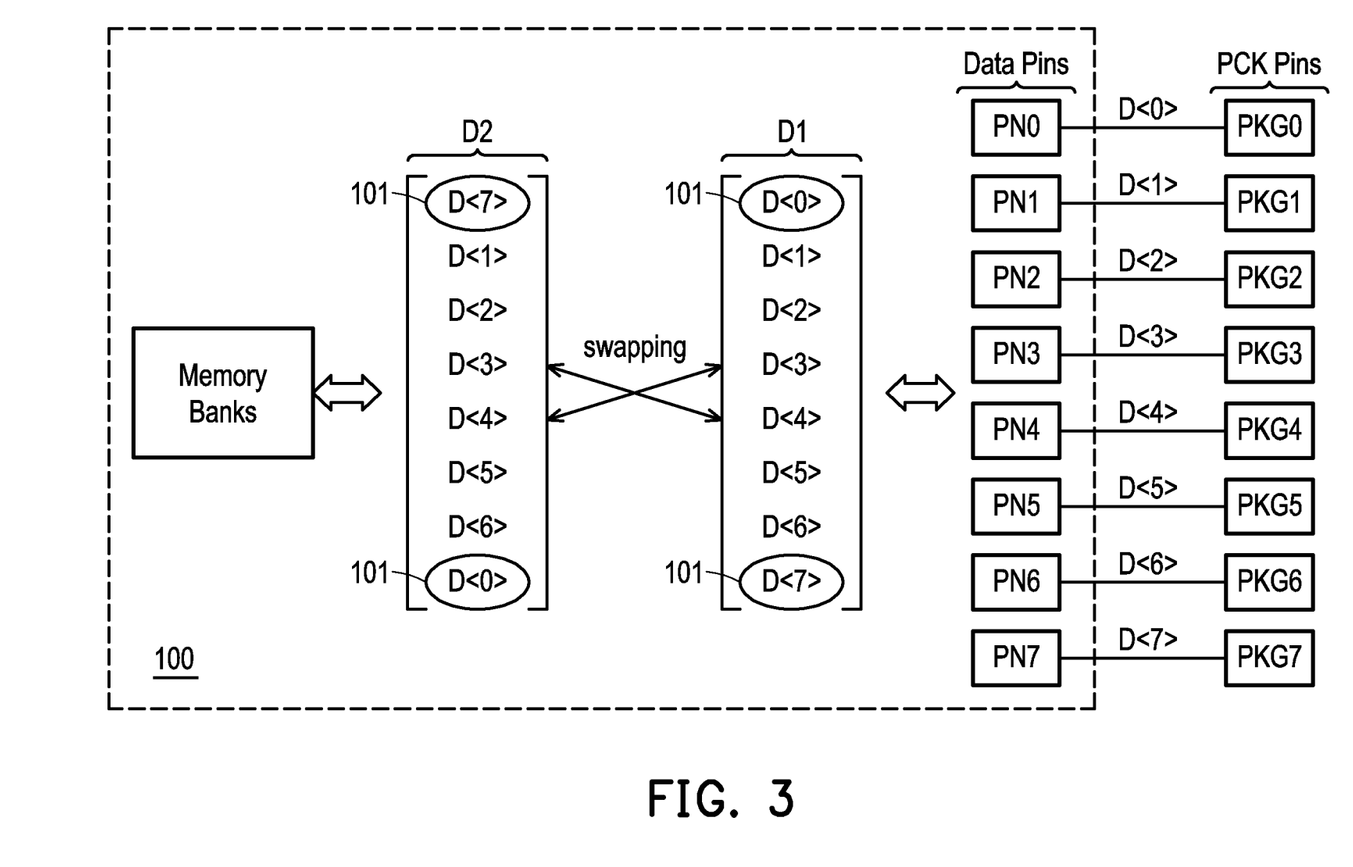
FIG. 3 is a schematic diagram illustrating a memory device having a plurality of data pins and a plurality of corresponding package pins in accordance with some embodiments

FIG. 3 illustrates a schematic diagram of a memory device 100 having a plurality of data pins PN0 through PN7 and a plurality of corresponding package pins PKG0 through PKG7 in accordance with some embodiments. The data pins PN0 through PN7 may be electrically connected to the corresponding package pins PKG0 through PKG7 in a packaging process. A configuration (i.e., bit order) of the data pins PN0 through PN7 may be the same as or different from a configuration (i.e., bit order) of the package pins PKG0 through PKG7. In some embodiments, the package pins PKG0 through PKG7 corresponds to a first bit order, and the data pins PN0 through PN7 corresponds to a second bit order, in which the first bit order is different from the second bit order. For example, the first bit order corresponding to the package pins PKG0 through PKG7 may include a bit arrangement in sequence of [D<0>, D<1>, D<2>, D<3>, D<4>, D<5>, D<6>, D<7>], and the second bit order corresponding to the data pins PN0 through PN7 may include a bit arrangement in sequence of [D<7>, D<1>, D<2>, D<3>, D<4>, D<5>, D<6>, D<0>]. Since the data pins PN0 through PN7 and the package pins PKG0 through PKG7 have different configurations, at least one swapping operation is required to assure proper operation of the memory device 100 after the packaging process.

Referring to FIG. 3, in a write operation, the package pins PKG0 through PKG7 may transfer data D1 which has the first bit order being represented as [D<0>, D<1>, D<2>, D<3>, D<4>, D<5>, D<6>, D<7>] to the corresponding data pins PN0 through PN7. In other words, the package pin PKG0 may transfer the bit data D<0> of the data D1 to the corresponding data pin PN0; and the package pin PKG7 may transfer the bit data D<7> of the data D1 to the corresponding data pin PN7. The memory device 100 is configured to perform at least one swapping operation on the data D1 to generate data D2 which has the second bit order being represented as [D<7>, D<1>, D<2>, D<3>, D<4>, D<5>, D<6>, D<0>]. The ellipses 101 shown in FIG. 3 represents the bit data where being swapped by the at least one swapping operation performed by the memory device 100. Referring to FIG. 1 and FIG. 3, the at least one swapping operation may be performed by the switches SW1 through SW5 illustrated in FIG. 1. The data D2 are then transferred to the memory banks of the memory device 100.

In a read operation, the data D2 which has the second bit order being represented as [D<7>, D<1>, D<2>, D<3>, D<4>, D<5>, D<6>, D<0>] is read out from the memory banks of the memory device 100. At least swapping operation is performed on the data D2 to generate the data D1 which has the first bit order being represented as [D<0>, D<1>, D<2>, D<3>, D<4>. D<5>, D<6>, D<7>]. The data D1 is then transferred to the package pins PKG0 through PKG7 via the data pins PN0 through PN7. In this way, the memory device 100 may flexibly assign the appropriate configuration for the data pins PN0 though PN7; and thus, the memory device 100 may be compatible with various configurations of package pins.

Figure 4:
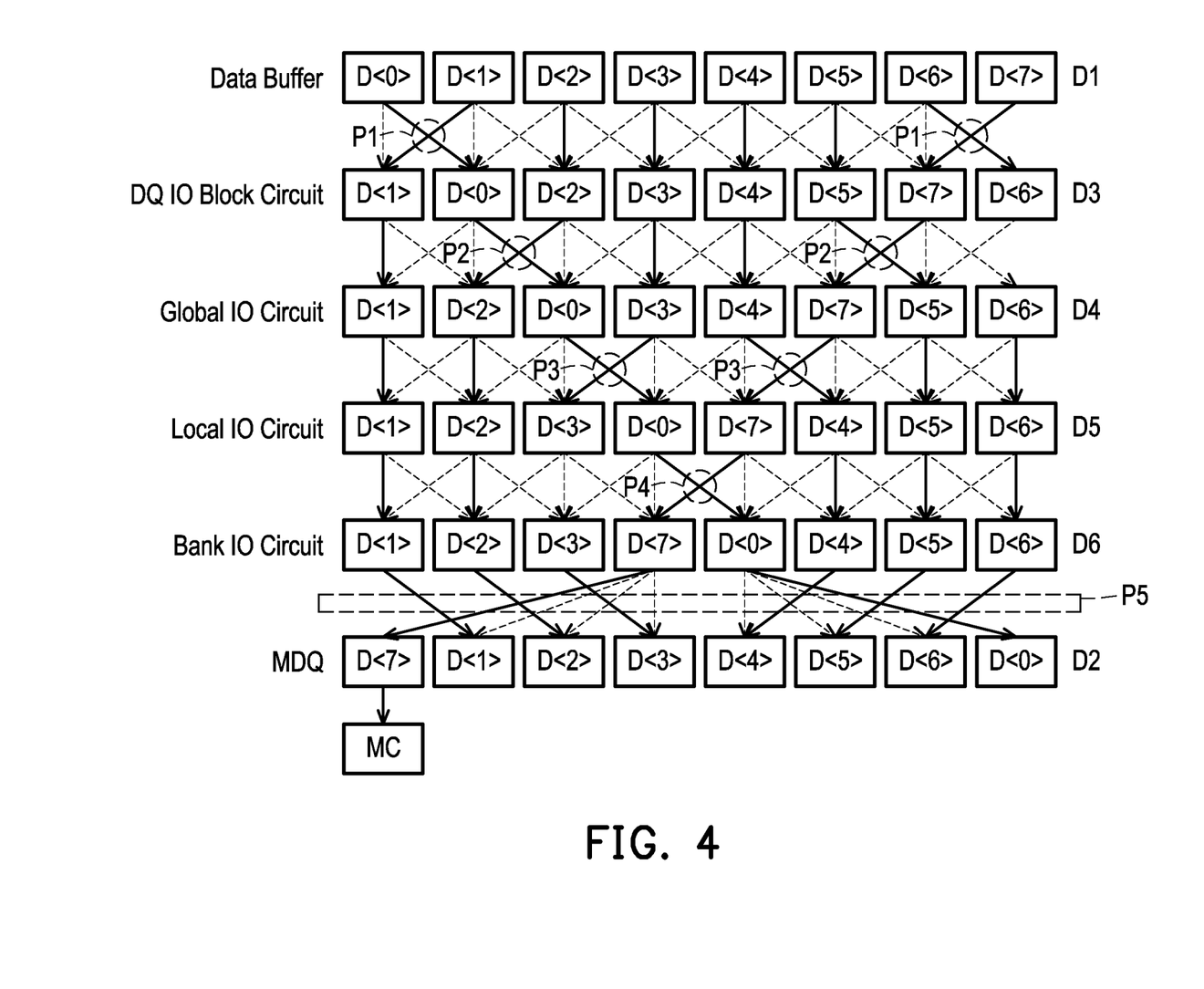
FIG. 4 is a schematic diagram illustrating a plurality of swapping operations in a write operation performed on a memory device in accordance with some embodiments.

FIG. 4 is a schematic diagram illustrating a plurality of swapping operations in a write operation performed on a memory device (i.e., memory device 100 in FIG. 1) in accordance with some embodiments. Referring to FIG. 1 and FIG. 4, the data buffer 142 receives data D1 in the first order (i.e., [D<0>, D<1>, D<2>, D<3>, D<4>, D<5>, D<6>, D<7>]) from the package pins PCK0 through PCK7 via the data pins PN0 through PN7. The switch SW1 is configured to performs a first swapping operation on the data D1 to generate a data D3 which has a bit order of [D<1>, D<0>, D<2>, D<3>, D<4>, D<5>, D<7>, D<6>], wherein the first swapping operation performed by the switches SW1 is represented by circles P1 in FIG. 4. The data D3 is transferred from the DQ IO block circuit 146 to the global IO circuit 130. The switch SW2 is configured to perform a second swapping operation on the data D3 to generate a data D4 which has a bit order of [D<1>, D<2>, D<0>, D<3>, D<4>, D<7>, D<5>, D<6>], wherein the second swapping operation performed by the switches SW2 is represented by circles P2 in FIG. 4. The data D4 is then transferred from the global IO circuit 130 to a selected local IO circuit (i.e., local IO circuit 120_1 in FIG. 1). The switch SW3 is configured to perform a third swapping operation on the data D4 to generate a data D5 which has a bit order of [D<1>, D<2>, D<3>, D<0>, D<7>, D<4>, D<5>, D<6>], wherein the third swapping operation performed by the switches SW3 is represented by circles P3 in FIG. 4. The data D5 is then transferred from selected local IO circuit to a selected bank IO circuit (i.e., bank IO circuit 116 in FIG. 1). The switch SW4 is configured to perform a fourth swapping operation on the data D5 to generate a data D6 which has a bit order of [D<1>, D<2>, D<3>, D<7>, D<0>, D<4>, D<5>, D<6>], wherein the fourth swapping operation performed by the switches SW4 is represented by a circle P4 in FIG. 4. The switch SW5 is configured to perform a fifth swapping operation on the data D6 to generate a data D2 which has the second bit order of [D<7>, D<1>, D<2>, D<3>, D<4>, D<5>, D<6>, D<0>], wherein the fifth swapping operation performed by the switch SW4 is represented by a rectangular P5 in FIG. 4. The data D2 which has the suitable bit order [D<7>, D<1>, D<2>, D<3>, D<4>, D<5>, D<6>, D<0>] is written to memory cells MC of at least one memory bank of the memory device 100.

Figure 5:
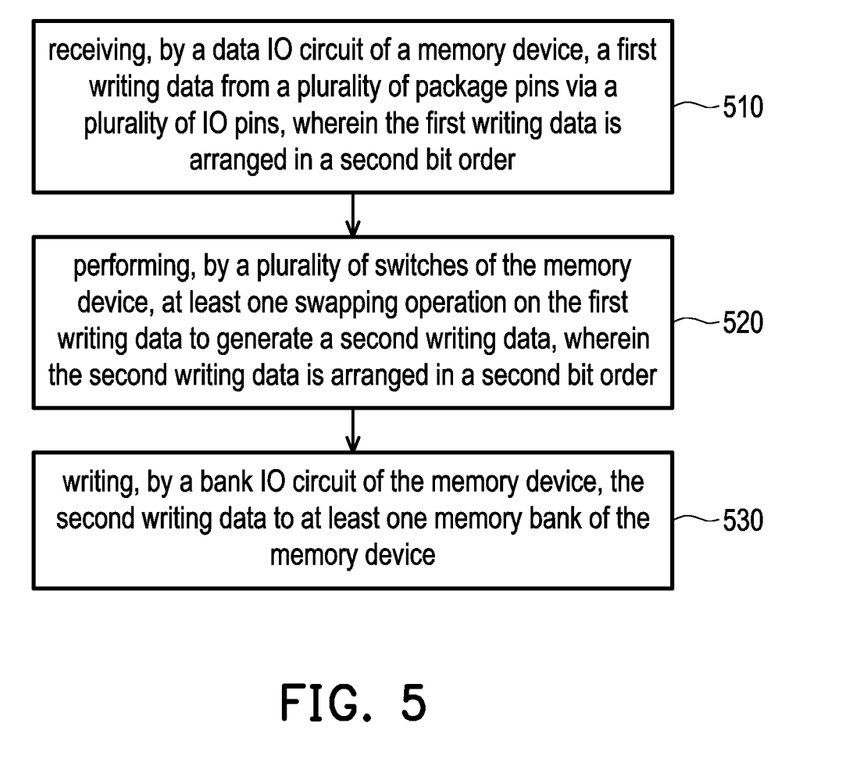
FIG. 5 is a flowchart diagram of a writing method of a memory device in accordance with some embodiments.

FIG. 5 is a flowchart diagram illustrating a writing method of a memory device (i.e., memory device 100 in FIG. 1) in accordance with some embodiments. The memory device may include a plurality of data pins being coupled to a plurality of package pins, wherein the plurality of package pins correspond to a first bit order, and the plurality of data pins correspond to a second bit order. In step 510, a first writing data is received, by a data IO circuit of the memory device, from the plurality of package pins via the plurality of data pins, wherein the first writing data is arranged in the first bit order. In step 520, at least one swapping operation is performed on the first writing data to generate a second writing data, wherein the second writing data is arranged in the second bit order. The at least one swapping operation may be performed by a plurality of switches of the memory device. In step 530, the second writing data is written by a bank IO circuit of the memory device to at least one memory bank of the memory device.

Figure 6:
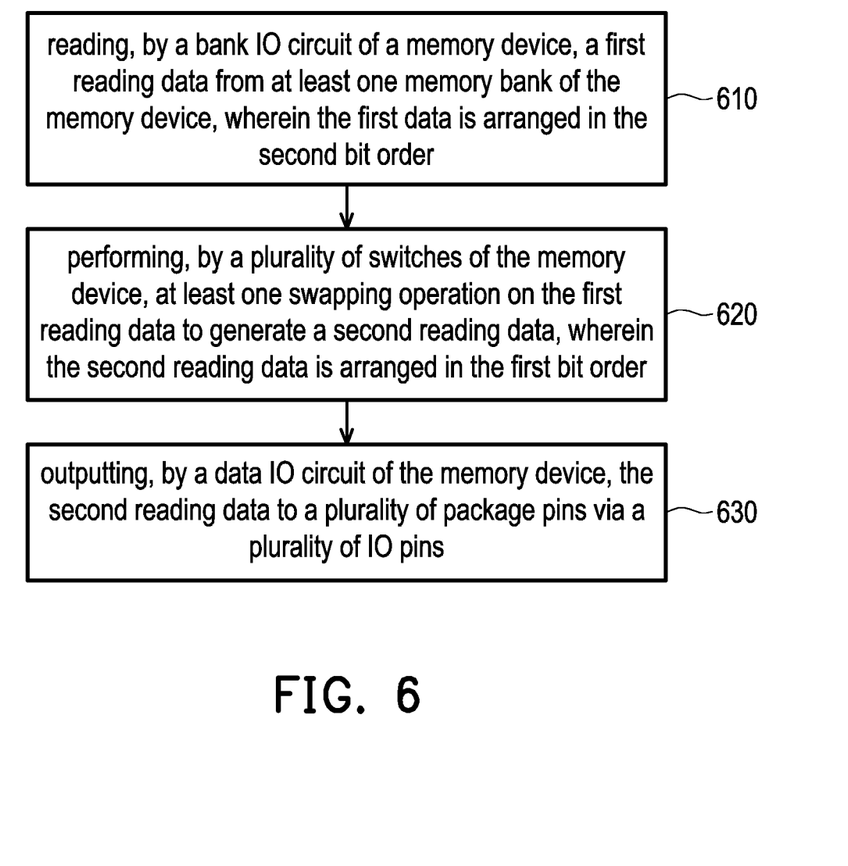
FIG. 6 is a flowchart diagram of a reading method of a memory device in accordance with some embodiments.

FIG. 6 is a flowchart diagram illustrating a reading method of a memory device (i.e., memory device 100 in FIG. 1) in accordance with some embodiments. The memory device may include a plurality of data pins being coupled to a plurality of package pins, wherein the plurality of package pins correspond to a first bit order, and the plurality of data pins correspond to a second bit order. In step 610, a first reading data is read, by a bank IO circuit of the memory device, from a plurality of memory cells of at least one memory bank of the memory device, wherein the first writing data is arranged in a second bit order. In step 620, at least one swapping operation is performed on the first reading data to generate a second reading data, wherein the second reading data is arranged in the first bit order. The at least one swapping operation is performed by a plurality of switches of the memory device. In step 630, the second reading data is outputted by a data IO circuit of the memory device to the plurality of package pins via the plurality of Data pins.

In accordance with the above embodiments, the plurality of switches of the memory device are configured to perform at least one swapping operation to flexibly assigning the configuration of the data pins of the memory device. As such, the data pins of the memory device may be compatible for various configurations of package pins, without a need of a redistribution layer between the data pins and the package pins. In this way, the memory device package has small footprint, low power consumption, and the memory device is applicable for a wide range of application.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A memory device, comprising:
   at least one memory bank, comprising a plurality of memory cells;
   a plurality of data pins, coupled to a plurality of package pins, wherein the plurality of package pins correspond to a first bit order, and the plurality of data pins correspond to a second bit order;
   a data input/output (IO) circuit, configured to communicate a first data with the plurality of data pins, wherein the first data is arranged in the first bit order;
   at least one bank IO circuit, configured to communicate a second data with the at least one memory bank, wherein the second data is arranged in the second bit order;
   a plurality of switches, configured to perform at least one swapping operation on the first data to generate the second data or to perform the at least one swapping operation on the second data to generate the first data;
   a data buffer, coupled to the plurality of data pins, configured to communicate the first data with the plurality of data pins; and
   a data output block IO circuit, coupled to the data buffer via the first switch,
   wherein the plurality of switches are controlled by a plurality of control signals, the plurality of switches comprises a first switch, the plurality of control signals comprises a first control signal, and the first switch is configured to receive the first data from the data buffer, perform a first swapping operation on the first data according to the first control signal to generate a third data, and output the third data to the data output block IO circuit.

2. The memory device of claim 1, wherein
   the plurality of control signals are determined according to a difference between the first bit order and the second bit order,
   the plurality of switches further comprises a second switch, a third switch, a fourth switch and a fifth switch, and
   the plurality of control signals further comprises a second control signal, a third control signal, a fourth control signal and a fifth control signal.

3. The memory device of claim 1, further comprising:
   at least one local IO circuit; and
   a global IO circuit, coupled between the data IO circuit and the at least one local IO circuit, configured to transfer data between the data IO circuit and the at least one local IO circuit, wherein the global IO circuit comprises:
   the second switch, configured to receive the third data from the data IO circuit, and perform a second swapping operation on the third data according to the second control signal to generate a fourth data; and
   a global multiplexer, configured to select a local IO circuit among the at least one local IO circuit, and transfer the fourth data to the selected local IO circuit.

4. The memory device of claim 3, wherein each of the at least one local IO circuit comprises:
   the third switch, configured to perform a third swapping operation on the fourth data according to the third control signal to generate a fifth data; and
   a local multiplexer, configured to select a bank IO circuit among at least one bank IO circuit, and transfer the fifth data to the selected bank IO circuit.

5. The memory device of claim 4, wherein each of the at least one bank IO circuit comprises:
   the fourth switch, configured to perform a fourth swapping operation on the firth data according to the fourth control signal to generate a sixth data, and transfer the sixth data to the fifth switch.

6. The memory device of claim 5, wherein the fifth switch is configured to perform a fifth swapping operation on the sixth data according to the fifth control signal to generate the second data.

7. A writing method of a memory device comprising a plurality of data pins being coupled to a plurality of package pins, wherein the plurality of package pins correspond to a first bit order, and the plurality of data pins correspond to a second bit order, the writing method comprising:
   receiving, by a data IO circuit of the memory device, a first writing data from the plurality of package pins via the plurality of data pins, wherein the first writing data is arranged in the first bit order;
   performing, by a plurality of switches of the memory device, at least one swapping operation on the first writing data to generate a second writing data, wherein the second writing data is arranged in the second bit order, wherein the plurality of switches are controlled by a plurality of control signals, the plurality of switches comprises a first switch, and the plurality of control signals comprises a first control signal;
   receiving, by the first switch, the first writing data from a data buffer of the data IO circuit;
   performing, by the first switch, a first swapping operation on the first writing data according to the first control signal to generate a third writing data; and
   outputting, by the first switch, the third writing data to a data output block IO circuit of the data IO circuit; and
   writing, by at least one bank IO circuit of the memory device, the second writing data to at least one memory bank of the memory device.

8. The writing method of claim 7, wherein
   the plurality of control signals are determined according to a difference between the first bit order and the second bit order,
   the plurality of switches further comprises a second switch, a third switch, a fourth switch and a fifth switch, and
   the plurality of control signals further comprises a second control signal, a third control signal, a fourth control signal and a fifth control signal.

9. The writing method of claim 7, further comprising:
   performing, by the second switch, a second swapping operation on the third writing data according to the second control signal to generate a fourth writing data;
   selecting, by a global multiplexer of a global IO circuit of the memory device, a local IO circuit among at least one local IO circuit of the memory device; and
   transferring, by the global multiplexer, the fourth writing data to the selected local IO circuit.

10. The writing method of claim 9, further comprising:
    performing, by the third switch, a third swapping operation on the fourth writing data according to the third control signal to generate a fifth writing data;
    selecting, by a local multiplexer of the selected local IO circuit, a bank IO circuit among at least one bank IO circuit of the memory device; and
    transferring, by the local multiplexer of the selected local IO circuit, the firth writing data to the selected bank IO circuit.

11. The writing method of claim 10, further comprising:
performing, by the fourth switch, a fourth swapping operation on the fifth writing data according to the fourth control signal to generate a sixth data; and
performing, by the fifth switch, a fifth swapping operation on the sixth writing data according to the fifth control signal to generate the second writing data.

12. A reading method of a memory device comprising a plurality of data pins being coupled to a plurality of package pins, wherein the plurality of package pins correspond to a first bit order, and the plurality of data pins correspond to a second bit order, the reading method comprising:
reading, by a bank IO circuit of the memory device, a first reading data from at least one memory bank of the memory device, wherein the first data is arranged in the second bit order;
performing, by a plurality of switches of the memory device, at least one swapping operation on the first reading data to generate a second reading data, wherein the second reading data is arranged in the first bit order, wherein the plurality of switches are controlled by a plurality of control signals, the plurality of switches comprises a first switch, and the plurality of control signals comprises a first control signal;
performing, by the fifth switch, a first swapping operation on the first reading data according to the fifth control signal to generate a third reading data;
transferring the third reading data to a bank IO circuit of the memory device;
performing, by the fourth switch included in the bank IO circuit, a second swapping operation on the third reading data according to the fourth control signal to generate a fourth reading data; and
outputting, by a data IO circuit of the memory device, the second reading data to the plurality of package pins via the plurality of data pins.

13. The reading method of claim 12, wherein
the plurality of control signals are determined according to a difference between the first bit order and the second bit order,
the plurality of switches further comprises a second switch, a third switch, a fourth switch and a fifth switch, and
the plurality of control signals further comprises a second control signal, a third control signal, a fourth control signal and a fifth control signal.

14. The reading method of claim 12, further comprising:
transferring the fourth reading data to a local IO circuit of the memory device; and
performing, by the third switch included in the local IO circuit, a third swapping operation on the fourth reading data according to the third control signal to generate a fifth reading data.

15. The reading method of claim 14, further comprising:
transferring the fifth reading data to a global IO circuit of the memory device; and
performing, by the second switch included in the global IO circuit, a fourth swapping operation on the fifth reading data according to the second control signal to generate a sixth reading data.

16. The reading method of claim 15, further comprising:
transferring the sixth reading data to the data IO circuit of the memory device; and
performing, by the first switch included in the global IO circuit, a fifth swapping operation on the sixth reading data according to the first control signal to generate the second reading data.

* * * * *